June 11, 1963   E. L. CURRIER, JR., ETAL   3,093,566
NUCLEAR REACTOR FUEL ELEMENT
Filed Nov. 7, 1958   2 Sheets-Sheet 1
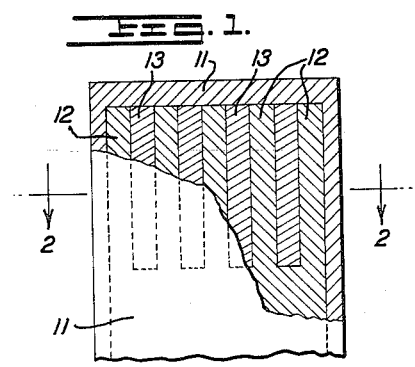
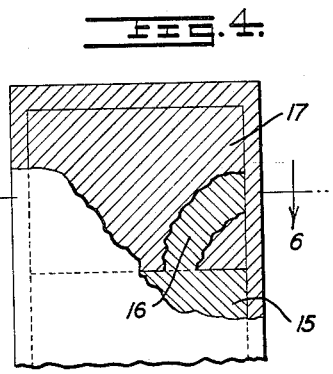
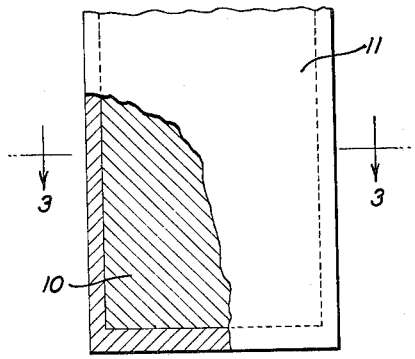
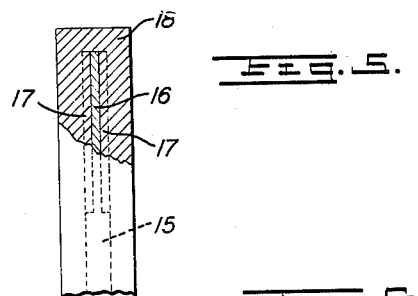
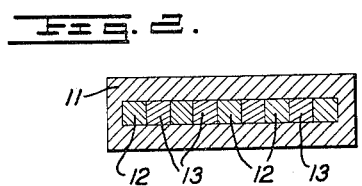
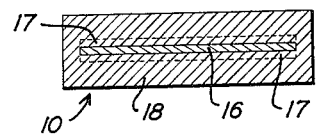
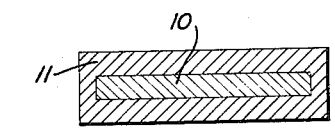
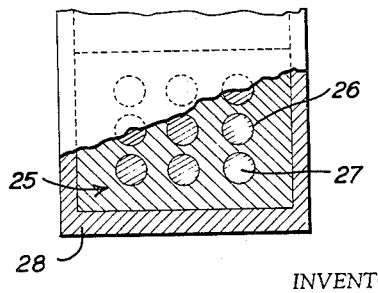
INVENTORS.
EDWIN L. CURRIER, JR.
JOHN H. NICKLAS
BY
*H. Friedrich Hamann*
ATTORNEY

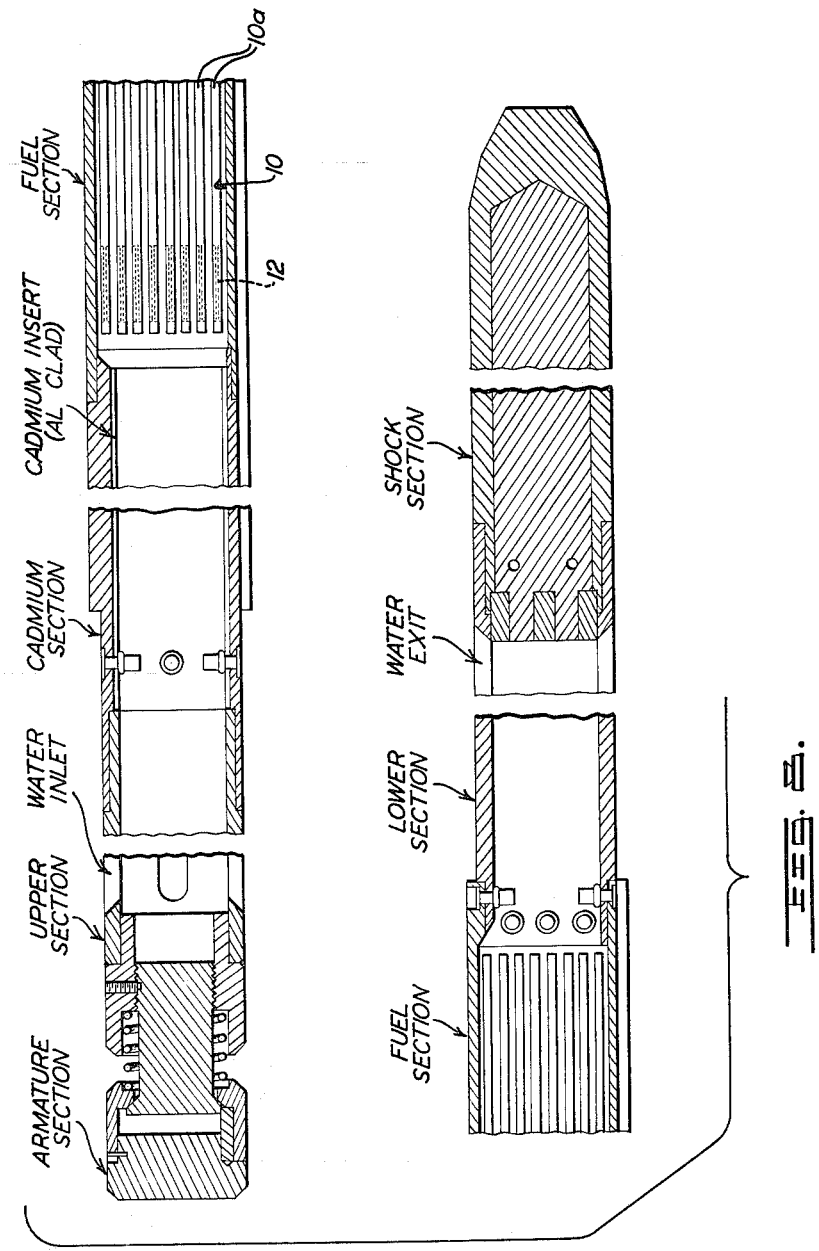

3,093,566
NUCLEAR REACTOR FUEL ELEMENT

Edwin L. Currier, Jr., Silver Spring, and John H. Nicklas, Riverdale, Md., assignors, by mesne assignments, to the United States of America as represented by the United States Atomic Energy Commission
Filed Nov. 7, 1958, Ser. No. 772,575
5 Claims. (Cl. 204—193.2)

The present invention is directed to nuclear reactor fuel element sections and, particularly, to fuel plates with variations in fissionable material content.

In high flux nuclear reactors utilized for testing such as the MTR, it is common practice to incorporate into the control rods a fissionable material containing fuel section. This practice has the purpose of increasing the control rod worth, in that, since the poison section and the fuel containing section of the control rod are attached lengthwise, when the control poison is inserted into the core region, the fuel containing section attached to it is removed from the core. Likewise, as the control poison is withdrawn from the core of the reactor the fuel containing section will be inserted. In this manner a double gain in reactivity is produced. Such a combination control rod fuel containing assembly is shown and described in "Research Reactors," USAEC (McGraw Hill Co., 1955), in Fig. 3–13, and, particularly, pages 168, 170 and 172, the disclosure of which is incorporated herein by reference.

One of the fundamental disadvantages of the arrangement shown in the referenced publication is that the neutron flux will tend to go to excessively high values at the ends of the control rod fuel containing sections at the point nearest the poisoning material, if there is too much moderator between the end of the fuel and the start of the poison material. Such conditions exist upon the insertion or withdrawal of the rod.

It is the general object of the present invention to obviate this disadvantage, thereby preventing flux peaking in the end portion of the fuel containing section.

It is another object of the present invention to provide a product to prevent such flux peaking while maintaining the fuel plates of the fuel containing section of the control rod of equal length and width, so that similar fuel containing plates can be utilized in all control rods.

It is a still further object of the present invention to provide a reduced fissionable material content at, at least, one of the ends of the fuel containing section to prevent dangerous flux peaking.

It is another object of the present invention to provide a simple, inexpensive and reliable means for preventing flux peaking in the fissionable material located adjacent to the poison portion of a control rod.

The invention embodies other novel features, details of construction and arrangement of parts which are hereinafter set forth in the specification and claims and illustrated in the accompanying drawings which are hereby made a part of the specification, wherein:

FIG. 1 is a side view of one of the fuel plates utilized in the fuel containing section.

FIG. 2 is a sectional view along line 2—2 of FIGURE 1.

FIG. 3 is a sectional view along line 3—3 of FIGURE 1.

FIG. 4 is a side view of a second embodiment of the present invention.

FIG. 5 is an end view of FIGURE 4 in partial section.

FIGURE 6 is a sectional view along line 6—6 of FIGURE 4.

FIG. 7 is a side view of a third embodiment of the present invention.

FIG. 8 is a sectional view of a fuel element utilizing the fuel plates of the present invention.

Referring now to FIGURE 1, there is shown a side view of one of the fissionable material containing plates in accordance with the present invention, which may be utilized in the control rod disclosed in the above referenced publication and shown schematically in FIGURE 8 hereof. Specifically, the plate 10 is a fuel alloy, which may contain uanium enriched with $U^{235}$, e.g., preferably 20% enrichment or more. Other fissionable materials are $U^{233}$ and $Pu^{239}$. This uranium, in the preferred embodiment, is alloyed with aluminum to form an alloy with a particular uranium content, for example, between 5 w/o and 50 w/o. The uranium content of the alloy is not critical in the present invention and will depend upon the reactor core configuration. Other materials may also be included in the alloy to enhance workability or to provide other desirable properties, as is well known in the art. Surrounding the fuel plate 10 is a cladding or container 11, generally fabricated from aluminum or aluminum alloy, which is preferably metallurgically bonded to the fuel alloy core of 10. Such a cladding is, generally, 0.015 to 0.020 inch thick on the flat surfaces and about $\frac{5}{32}$ inch thick on the edges.

The main body of the fuel plate 10 has, in the preferred embodiment shown in FIGURE 1, a plurality of fingers 12 on at least one end, i.e., the end of the plate 10 which will, after assembly, be adjacent to the poison of the control rod. These fingers are fabricated so that, preferably, about one-half of the uranium is removed from each plate for a distance of from one to about four inches from the end. Although the fingers shown have parallel sides, it is within the purview of this invention to utilize tapered, pointed or rounded fingers to accomplish the purposes set forth above.

FIGURE 2 is a sectional view of FIGURE 1 showing the fingers 12 spaced within the cladding material 11. It should be noted that the fingers 12 of fissionable material are, preferably, of equal length and cross-sectional area to facilitate fabrication. However, variations in length or area may be made without adversely affecting the fundamental object of preventing flux peaking at the end of the fuel containing section.

FIGURE 3 is a cross section of the main body of the fuel plate 10 showing the orientation of the plate 10 with respect to the cladding 11 after the bonding or encasing procedure, as described hereinafter.

In fabricating the preferred fuel plate, as shown in FIGURE 1, the fissionable material containing body 10 is first fabricated by the usual methods into a rectangular shape. The fingers 12 are fabricated from such a body by removing the volume between the fingers 12 by any skill of the art technique. Blanks 13 of aluminum, or of an aluminum alloy, are then placed between the fingers. These blanks 13 may, if desirable for a particular reactor, contain very small amounts of poisoning material to further enhance the transitional characteristics of the assembly from a poison to a fuel as the rod is removed or inserted or, if desirable, containing thermal neutron non-fissionable material such as $U^{238}$ or $Th^{232}$.

The actual assembly of the fuel plate 10 including the fingers 12, blanks 13, with the cladding 11, could be accomplished in a number of ways, such as, common roll-bonding of the plate 10, pressed in aluminum picture frame with cover plates rolled on, or of welding the cover sheets along the edges. Methods of cladding or encasing fissionable material are well known in the art and are, therefore, not here described in detail. See, for example, ANL–5607, USAEC, "The Experimental Boiling Water Reactor," pages 184–201; U.S. Patents 2,848,796; 2,848,-797; 2,813,073 and 2,820,751, the disclosures of which are incorporated herein by reference.

Other variations of the present invention are apparent from FIGURE 4, in which a body 15 of fissionable material containing substances of standard or desired thickness has, at least, one end portion 16 which has a reduced thickness and, therefore, a lesser content of fissionable material per unit surface area. In the preferred form of this embodiment, the portion 16 has parallel sides in order to facilitate fabrication. However, tapered sides may also be utilized.

In this embodiment, see FIGURE 5, blanks 17 are also required to facilitate the fabrication. The method of assembling and of obtaining the required bonds is the same as described, with respect to the first embodiment. Upon bonding, the blanks will essentially lose their separate identity with respect to the cladding material 18 and, therefore, in FIGURE 6 the blanks 17 are shown as bounded by dotted lines.

The blanks 17 are, preferably, fabricated of the same material as the cladding. However, it is within the purview of this invention to include in these blanks, as well as the blanks utilized in FIGURE 1, a low concentration of neutron absorbing material to improve the transitional characteristics during withdrawal or insertion. In this respect, such blanks, i.e., having a neutron absorber, would only be utilized at the end of the fuel containing section which is adjacent to the control rod poison containing section. However, it should be noted that both ends of the fuel containing plates may have reduced fissionalble material volume to eliminate any chance of misassembly so that the wrong end of the plates would be adjacent the poison containing sections.

It is also apparent to those skilled in the art, from FIGURES 4 and 5, that the portion 16 may be fabricated to form a transversely bifurcated end so that an insert or blank would be contained between the two branches. It is also apparent that combinations of the embodiments of FIGURES 1 and 4 could be utilized and that tapered, rather than parallel, edges on the fingers and end portions could be utilized. However, the embodiments shown in FIGURES 1 and 4 have the advantage of simplified and less costly fabrication, with a high degree of reproducibility of results between fuel containng plates.

FIGURE 7 is a side view of a third embodiment of the present invention in which the fissionable element containing material 25 has holes 26 which have been filled with a material 27 which may be the same as the cladding or encasing material 28. If the roll-bonding technique is utilized in fabricating this embodiment the filled holes will not be circular but will be ellipses, the elongation resulting from the rolling process.

FIGURE 8 shows an example of the fuel element containing control rod in which the fuel plates of the present invention may be utilized. It is, however, within the purview of the present invention to utilize such plates in other types of fuel elements. Specifically, the shim-safety rod with fuel shown in FIGURE 8 is of a standard type, except for the fuel plates. Therefore, no detailed description of the rod is included herein. In the fuel section the plates 10 are shown as having a first section 10a with a standard volume of fissionable material per unit volume and fingers 12 constituting, in this embodiment, a second section with a volume of fissionable material per unit volume which is less than that of the first section 10a. The lower end of the fuel section is shown as having the standard volume, although this may be modified as pointed out hereinbefore.

In all of the embodiments of the present invention, it is desirable to have from about one-third to about three-quarters as much fissionable material in the end portion as in the center portion on the basis of a unit volume of the assembled plate. Obviously, the exact reduction desired will depend upon the particular reactor. Thus, for example, in reactors of the MTR type, a one-half reduction is preferred. In this manner, a smoother neutron flux density distribution about the end of the fuel containing section is obtained and flux peaking, at this point, is virtually eliminated.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A nuclear reactor fuel element containing control rod having a neutron poison material and at least one fuel plate, said plate having a first section containing a first volume of fissionable material and a second slotted section containing a second volume of fissionable material, from about one-third to about three-quarters of said first volume per unit length of fuel plate, said second section being adjacent to the neutron poison material of said control rod.

2. A nuclear reactor fuel containing control rod having a fuel containing section and a poison containing section, said fuel containing section being slotted at the end thereof adjacent to said poison containing section to reduce the fissionable material content at said end from about one-third to about three-quarters of the unslotted portion per unit volume of the plate.

3. A nuclear reactor fuel containing control rod having a poison containing section and a fuel containing section, said fuel containing section having a plurality of fissionable material containing plates, each of said plates being slotted at the end adjacent said poison section so that said end contains from about one-third to about three-quarters of the fissionable material content of the unslotted remainder per unit volume of said plate.

4. In a nuclear reactor control rod comprised of a lengthwise section containing neutron poison material and a lengthwise section containing fissionable fuel material adjacent to but spaced from the poison section, the improvement wherein the fuel material is in plate form and each plate is slotted at the end adjacent the poison material so that the slotted end contains from about one-third to about three-quarters as much fissionable material per unit length as the unslotted part of the fuel plate.

5. The control rod as claimed in claim 4 wherein the slotted end of the fuel plate has a plurality of lengthwise slots and contains about one-half as much fissionable material as the unslotted portion per unit length, the fuel plate is cladded in aluminum, and said slots are filled with aluminum.

References Cited in the file of this patent

UNITED STATES PATENTS

| 2,831,806 | Wigner | Apr. 22, 1958 |
| 2,843,539 | Burnstein | July 15, 1958 |
| 2,852,456 | Wade | Sept. 16, 1958 |
| 2,870,076 | Koch | Jan. 20, 1959 |
| 2,996,443 | Schaner | Aug. 15, 1961 |

OTHER REFERENCES

AEC document AECD–3715, Feb. 1, 1954, p. 11.
Research Reactors, TID–5275, 1955, pp. 168–171.
GER–1301, A Design Description of the Dresden Nuclear Power Station, November 1956, pp. 12–14.
APAE–8, Army Package Power Reactor Zero Power Experiments (ZPE–1), February 1957, pp. 107 and 113–116.
WAPD–MRP–68, PWR Report, August 1957, p. 79.
CRL–47, November 1957, in particular the abstract before p. 1.
TID–7559 (Part 1), Fuel Elements Conference, May 1958, pp. 53–69 and 133–135.
APAE–32 Reactor Analysis APPR–1 Core II, July 1958, pp. 41–63.
Paper A/Conf. 15/p/191, by O. J. C. Runnalls, Sept. 9, 1958 (for presentation at Second Geneva Conference of Peaceful Uses of Atomic Energy).